(12) United States Patent
Cohoon et al.

(10) Patent No.: US 12,367,042 B2
(45) Date of Patent: Jul. 22, 2025

(54) MULTIPATHING CODE EXECUTION BASED ON FAILURE SEVERITY BACKGROUND

(71) Applicant: INTERNATIONAL BUSINESS MACHINES CORPORATION, Armonk, NY (US)

(72) Inventors: Michael Terrence Cohoon, Fishkill, NY (US); Andrew C. M. Hicks, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 18/538,166

(22) Filed: Dec. 13, 2023

(65) Prior Publication Data

US 2025/0199808 A1   Jun. 19, 2025

(51) Int. Cl.
*G06F 11/00* (2006.01)
*G06F 9/30* (2018.01)
*G06F 11/07* (2006.01)

(52) U.S. Cl.
CPC ...... *G06F 9/30061* (2013.01); *G06F 11/0793* (2013.01)

(58) Field of Classification Search
CPC ............. G06F 9/30061; G06F 11/0793; G06F 11/1489
See application file for complete search history.

(56) References Cited

U.S. PATENT DOCUMENTS

| | | | |
|---|---|---|---|
| 5,119,488 A | 6/1992 | Takamatsu et al. | |
| 5,269,017 A | 12/1993 | Hayden et al. | |
| 6,625,747 B1 | 9/2003 | Tawil et al. | |
| 6,658,656 B1 * | 12/2003 | Thompson | G06F 11/1489 717/122 |
| 6,874,138 B1 * | 3/2005 | Ziegler | G06F 11/1489 717/124 |
| 7,536,603 B2 | 5/2009 | Coldicott et al. | |
| 7,546,588 B2 | 6/2009 | Dickenson | |
| 7,668,981 B1 | 2/2010 | Nagineni et al. | |
| 8,527,743 B2 | 9/2013 | Genta et al. | |
| 8,938,644 B2 | 1/2015 | Clark et al. | |
| 9,563,538 B2 | 2/2017 | Bestgen et al. | |
| 9,733,912 B2 | 8/2017 | Adl-Tabatabai et al. | |
| 9,847,933 B2 | 12/2017 | DeCusatis et al. | |
| 9,904,585 B1 | 2/2018 | Islam et al. | |

(Continued)

FOREIGN PATENT DOCUMENTS

| | | | |
|---|---|---|---|
| CN | 102262537 A | 11/2011 | |
| CN | 106547520 A | 3/2017 | |

OTHER PUBLICATIONS

Cohoon et al., Modification-Based Multipathing Code, International Business Machines Corporation (IBM), U.S. Appl. No. 18/538,294, filed Dec. 13, 2023, 24 pages.

(Continued)

*Primary Examiner* — Jason B Bryan (74) *Attorney, Agent, or Firm* — Onyx IP Group (57) ABSTRACT

Multipathing code execution based on failure severity includes: detecting a corresponding error in each path of a plurality of paths of a portion of multipathing code of an application; identifying, from the plurality of paths, a path having a lowest error severity; and resuming execution of the application using the identified path.

20 Claims, 4 Drawing Sheets

Detect A Corresponding Error In Each Path Of A Plurality Of Paths Of A Portion Of Multipathing Code Of An Application 202

Identify, From The Plurality Of Paths, A Path Having A Lowest Error Severity 204

Resume Execution Of The Application Using The Identified Path 206

(56) References Cited

U.S. PATENT DOCUMENTS

| | | |
|---|---|---|
| 10,389,639 B1 | 8/2019 | Matthews et al. |
| 10,990,481 B2 | 4/2021 | Borlick et al. |
| 2006/0191014 A1 | 8/2006 | Zvi et al. |

OTHER PUBLICATIONS

Hicks et al., Resilient Error Handling Through Multipathing Code, International Business Machines Corporation (IBM), U.S. Appl. No. 18/528,902, filed Dec. 5, 2023, 25 pages.

Appendix P; List of IBM Patent or Applications Treated as Related, Aug. 19, 2024, 2 pages.

* cited by examiner

FIG. 1

Detect A Corresponding Error In Each Path Of A Plurality Of Paths Of A Portion Of Multipathing Code Of An Application 202

Identify, From The Plurality Of Paths, A Path Having A Lowest Error Severity 204

Resume Execution Of The Application Using The Identified Path 206

FIG. 2

```
┌─────────────────────────────────────────────────────────────────────┐
│ Detect A Corresponding Error In Each Path Of A Plurality Of Paths Of A Portion Of Multipathing │
│                       Code Of An Application 202                    │
│  ┌───────────────────────────────────────────────────────────────┐  │
│  │ Store, For Each Path Of The Plurality Of Paths, Corresponding Failure Information In │
│  │       Response To Detecting The Corresponding Error 302        │  │
│  └───────────────────────────────────────────────────────────────┘  │
└─────────────────────────────────────────────────────────────────────┘
                                    │
                                    ▼
┌─────────────────────────────────────────────────────────────────────┐
│     Identify, From The Plurality Of Paths, A Path Having A Lowest Error Severity 204     │
└─────────────────────────────────────────────────────────────────────┘
                                    │
                                    ▼
┌─────────────────────────────────────────────────────────────────────┐
│            Resume Execution Of The Application Using The Identified Path 206            │
└─────────────────────────────────────────────────────────────────────┘
```

FIG. 3

```
┌─────────────────────────────────────────────────────────────────────────┐
│ Detect A Corresponding Error In Each Path Of A Plurality Of Paths Of A  │
│ Portion Of Multipathing Code Of An Application 202                      │
│  ┌───────────────────────────────────────────────────────────────────┐  │
│  │ Store, For Each Path Of The Plurality Of Paths, Corresponding      │  │
│  │ Failure Information In Response To Detecting The Corresponding     │  │
│  │ Error 302                                                          │  │
│  └───────────────────────────────────────────────────────────────────┘  │
└─────────────────────────────────────────────────────────────────────────┘
                                     │
                                     ▼
┌─────────────────────────────────────────────────────────────────────────┐
│ Identify, From The Plurality Of Paths, A Path Having A Lowest Error     │
│ Severity 204                                                             │
│  ┌───────────────────────────────────────────────────────────────────┐  │
│  │ Apply One Or More User-Defined Weights To The Corresponding        │  │
│  │ Failure Information For Each Path Of The Plurality Of Paths 402    │  │
│  └───────────────────────────────────────────────────────────────────┘  │
└─────────────────────────────────────────────────────────────────────────┘
                                     │
                                     ▼
┌─────────────────────────────────────────────────────────────────────────┐
│         Resume Execution Of The Application Using The Identified        │
│                              Path 206                                    │
└─────────────────────────────────────────────────────────────────────────┘
```

FIG. 4

MULTIPATHING CODE EXECUTION BASED ON FAILURE SEVERITY BACKGROUND

The present disclosure relates to methods, apparatus, and products for multipathing code execution based on failure severity.

SUMMARY

According to embodiments of the present disclosure, various methods, apparatus and products for multipathing code execution based on failure severity are described herein. In some aspects, multipathing code execution based on failure severity includes a method including: detecting a corresponding error in each path of a plurality of paths of a portion of multipathing code of an application; identifying, from the plurality of paths, a path having a lowest error severity; and resuming execution of the application using the identified path. In some aspects, an apparatus may include a processing device; and memory operatively coupled to the processing device, wherein the memory stores computer program instructions that, when executed, cause the processing device to perform this method. In some aspects, a computer program product comprising a computer readable storage medium may store computer program instructions that, when executed, perform this method.

DETAILED DESCRIPTION

When a code path fails in a complex software system, expected operations may fail to complete. Moreover, exhaustive retry logic may hog resources, transactions can begin to fail, and components of a stack may fail, leading to potential outage. Multipathing code may be used to mitigate concerns related to failures in code paths. Multipathing code describes the use of multiple, separate code paths configured to perform similar functionality. For example, different code paths may be configured or designed to generate the same outputs when applied to the same inputs or may be configured or designed to otherwise perform similar functionality. These different code paths designed to perform the same function may be implemented by different engineers or teams such that the resulting code paths are non-identical but designed to achieve the same outcome. These different code paths may also be written in different languages, access different libraries, or otherwise differ while being designed to achieve similar functionality. Each path of the multipathing code may be accessed using a shared interface, such as an Application Program Interface (API) or other interface as can be appreciated.

When a portion of multipathing code is encountered during the execution of an application or other software, state information may be saved that describes a state of execution at the point where the portion of multipathing code is encountered. The state information may describe the values for various registers, memory locations, counters, attributes, and the like. Should an error occur in a code path of the multipathing code, the saved state information may be used as a checkpoint for reverting or rewinding the state of execution of the application to a point prior to executing the code path of the multipathing code where the error occurred. A different code path of the multipathing code may then be executed. This process may be repeated until a code path of the multipathing code is executed without error. However, there may be some scenarios when all code paths of the multipathing code result in some sort of error.

Figure 1:
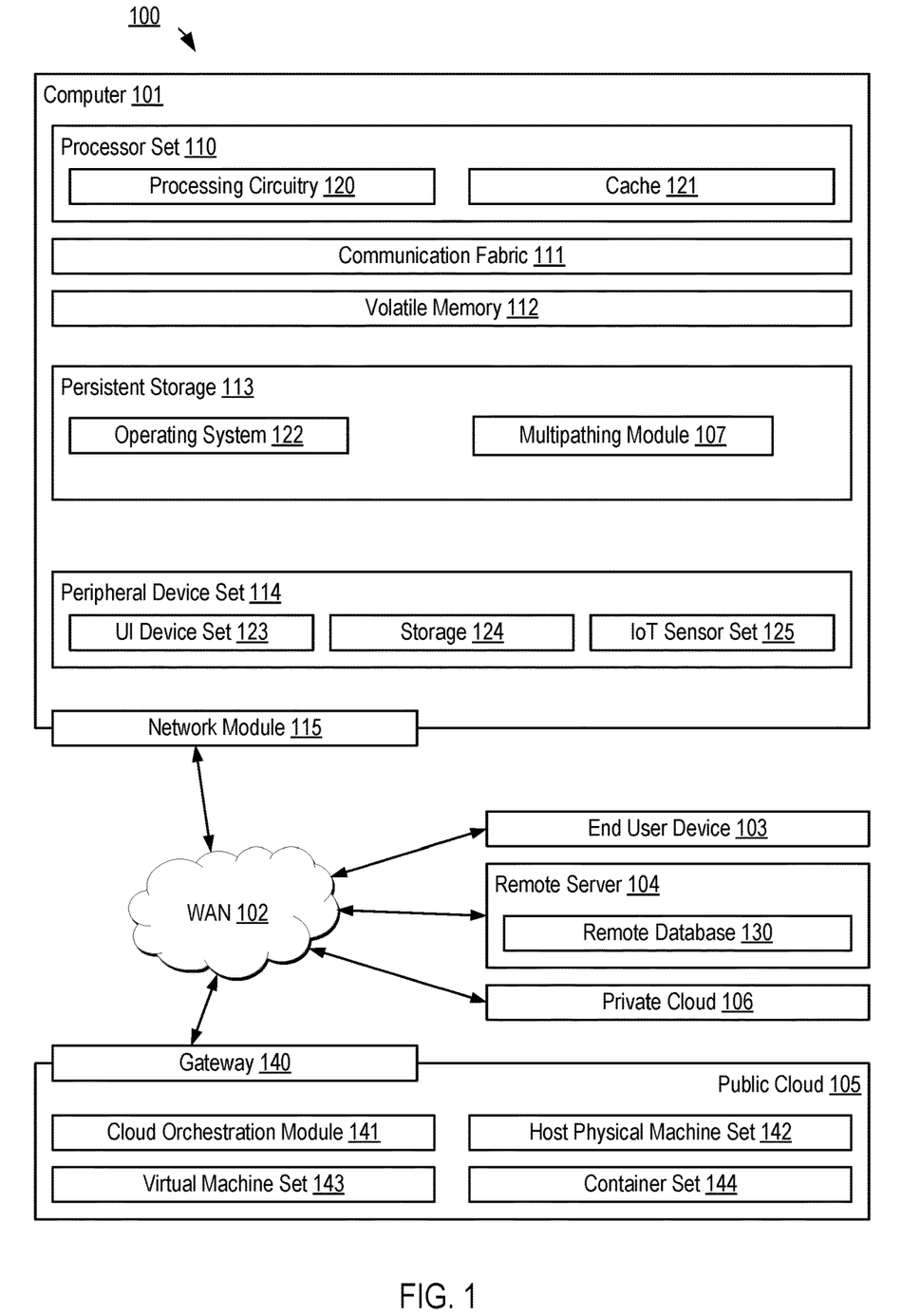
FIG. 1 sets forth a block diagram of an example computing environment for multipathing code execution based on failure severity in accordance with some embodiments of the present disclosure.

With reference now to FIG. 1, shown is an example computing environment according to aspects of the present disclosure. Computing environment 100 contains an example of an environment for the execution of at least some of the computer code involved in performing the various methods described herein, such as the multipathing module 107. In addition to the multipathing module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and multipathing module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods may be stored in multipathing module 107 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in multipathing module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
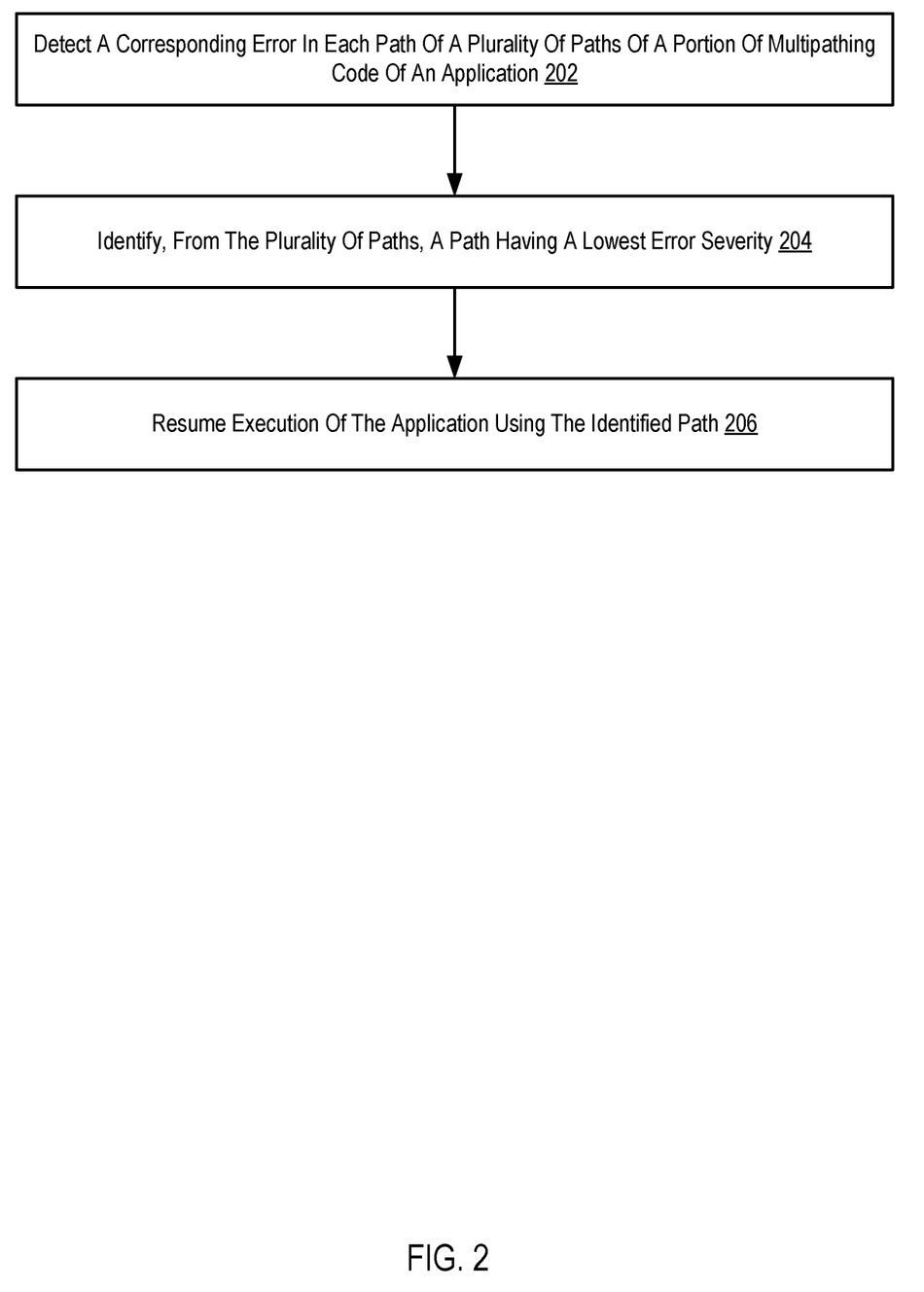
FIG. 2 sets forth a flowchart of an example method for multipathing code execution based on failure severity in accordance with some embodiments of the present disclosure.

For further explanation, FIG. 2 sets forth a flowchart of an example method of multipathing code execution based on failure severity in accordance with some embodiments of the present disclosure. The method of FIG. 2 may be performed, for example, by the multipathing module 107 of FIG. 1. In some embodiments, the multipathing module 107 may be implemented as a portion of code in an application or other software that implements multipathing code as described above. In some embodiments, the multipathing module 107 may be implemented as a process or service separate from an application or software implementing multipathing code. For example, the multipathing module 107 may be implemented by an operating system or other software that monitors the behavior and execution of an application implementing multipathing code.

The method of FIG. 2 includes detecting 202 a corresponding error in each path of a plurality of paths of a portion of multipathing code of an application. Although FIG. 2 describes the execution of multipathing code in an application, it is understood that the approaches set forth herein may be applied to any software or module implementing multipathing code, including applications, operating systems, libraries, and the like. In some embodiments, detecting 202 a corresponding error in each path of a plurality of paths of a portion of multipathing code of an application includes monitoring the execution of each code path of the portion of multipathing code during execution. During execution of each code path, some error is detected. Errors may include, for example, thrown exceptions, failed data validation or integrity checks, handled faults, unhandled faults, and the like.

As is set forth above, state information describing a state of execution prior to executing the multipathing code may be saved. Accordingly, after detecting an error in a given code path of the multipathing code, this state information may be used to restore the state of execution such that another code path in the multipathing code may be executed. This state information may be repeatedly used to restore the state of execution for the application until all code paths of the multipathing code have been executed and their corresponding error has been detected. In some embodiments, once all code paths of the multipathing code have been executed and their corresponding errors have been detected, this state information need not be used to restore the state of execution as there are no remaining code paths of the multipathing code to have their execution attempted.

The method of FIG. 2 also includes identifying 204, from the plurality of paths, a path having a lowest error severity. The error severity for a particular path of the multipathing code is an evaluation of the error encountered during execution of the particular path. In some embodiments, the error severity for a particular path may describe a severity of any effects caused by encountering the error, a severity of any metrics or resource utilizations caused by executing the particular path, and the like. As an illustrative example, a path where an unhandled or uncaught exception is thrown may have a higher error severity than a path where a handled or caught exception is thrown. As another illustrative example, a path where a particular transaction is canceled or is unable to be completed due to an encountered error may have a lower error severity than a path where data corruption or erasure occurs due to an encountered error. As a further illustrative example, a path where overall resource utilization is comparatively higher at the point of error may have a higher error severity than a path where overall resource utilization is comparatively lower at the point of error. One skilled in the art will appreciate that these examples are merely illustrative and that the particular approaches for determining an error severity may vary according to particular design or engineering considerations.

In some embodiments, the error severity for a particular path may be embodied or expressed as a score or other continuous value. In some embodiments, the error severity for a particular path may be embodied or expressed as a category or label (e.g., "low," "medium," "high," "critical," and the like). In some embodiments, in order to identify a path having a lowest error severity, the error severity for each path of the multipathing code may be determined. In some embodiments, determining the error severity for a particular path may be based on applying one or more functions or algorithms to various data points described in further detail below in order to calculate an error severity. In some embodiments, determining the error severity for a particular path may include applying one or more rules or one or more policies to these various data points. Determining the error severity for a particular code path may also be performed according to other approaches.

In some embodiments, the error severity for a particular path may be based on a variety of data points describing a state of execution when the error occurred. As will be described in further detail below, such data points may be indicated in failure information generated in response to detecting an error in a particular code path. In some embodiments, such data points may describe a state of a system (e.g., one or more computing devices) executing the application including the multipathing code, including an amount of computational resources, memory resources, network resources, and the like. In some embodiments, such data points may also include measurements of resource utilization over time prior to the error occurring. For example, in some embodiments, a higher resource utilization may contribute to a higher error severity while a lower resource utilization may contribute to a lower error severity.

In some embodiments, the data points used for determining an error severity for a particular path may include descriptions for the error encountered during execution of the particular path. In some embodiments, descriptions for an error may include error codes, reasons or messages generated in response to an error that describe the particular error, and the like. For example, in some embodiments, errors having a particular error code or having particular messages or keywords may contribute to a higher error severity level relative to other errors. In some embodiments particular errors may be assigned categories or labels describing their severity. Accordingly, in some embodiments, errors having labels or categories corresponding to higher severities may contribute to a higher error severity for their corresponding code path compared to other errors having labels or categories corresponding to lower severities.

In some embodiments, the data points used for determining an error severity for a particular code path may include an amount of the code path that was executed prior to encountering the error. The amount of the code path executed may be expressed as a percentage of the code path that was executed, a number of operations, functions, or lines of code executed, or another measurement as can be appreciated. For example, in some embodiments, executing a higher amount of code in a particular code path may contribute to a lower error severity for the particular code path compared to other code paths where a lower amount of code was executed prior to error.

In some embodiments, determining an error severity for a particular code path may be based on one or more health checks performed in response to the error occurring. Such health checks may include tests related to the availability of network connections or other communications paths to other resources, data integrity checks, and the like. In some embodiments, determining an error severity for a particular code path may be based on one or more user-defined goals or conditions that are checked or measured in response to detecting an error. One skilled in the art will appreciate that other data may also be used in determining the error severity for a particular code path.

Having determined the error severity for each path of the multipath code, the path having the lowest error severity is identified. Accordingly, the method of FIG. 2 also includes resuming 206 execution of the application using the identified path. Resuming 206 execution of the application using the identified path causes the application to execute based on the resultant state of having executed the identified path instead of any other path of the multipath code, including the error of the identified path. In some embodiments, resuming 206 execution of the application using the identified path includes restoring a state of execution to a point prior to executing any path of the multipathing code using the saved state information described above. In such embodiments, resuming 206 execution of the application using the identified path includes selecting the identified path for execution in the multipath code. Should the error be detected on this execution of the identified path, execution of the application will continue without attempting execution of another path of the multipathing code. In some embodiments, where failure information is generated in response to detecting an error in a particular code path, resuming 206 execution of the application using the identified path may include restoring a state of execution of the application based on the failure information for the identified path and resuming execution from a point at which the failure information was generated (e.g., at the point where the error was detected).

The approaches set forth above allow for applications or other software to continue operation where each path of a portion of multipathing code experiences an error. By selecting a path having the lowest error severity level for execution, this ensures that the application may continue executing while minimizing the potential impact of the error. As an example, assume that a portion of multipathing code is encountered in an application having paths A, B, and C. Further assume that executing each of these paths results in an error. In this example, assume that path A results in an unhandled exception that causes a memory fault, path B results in a handled exception, and path C results in an error that corrupts some saved data. Here, path B may be assigned a lowest severity level due to it resulting in a handled exception with no data corruption or memory faults. Execution of the application may resume using path B, ensuring that the application may continue to function while minimizing the overall impact of any encountered errors in the multipathing code.

Figure 3:
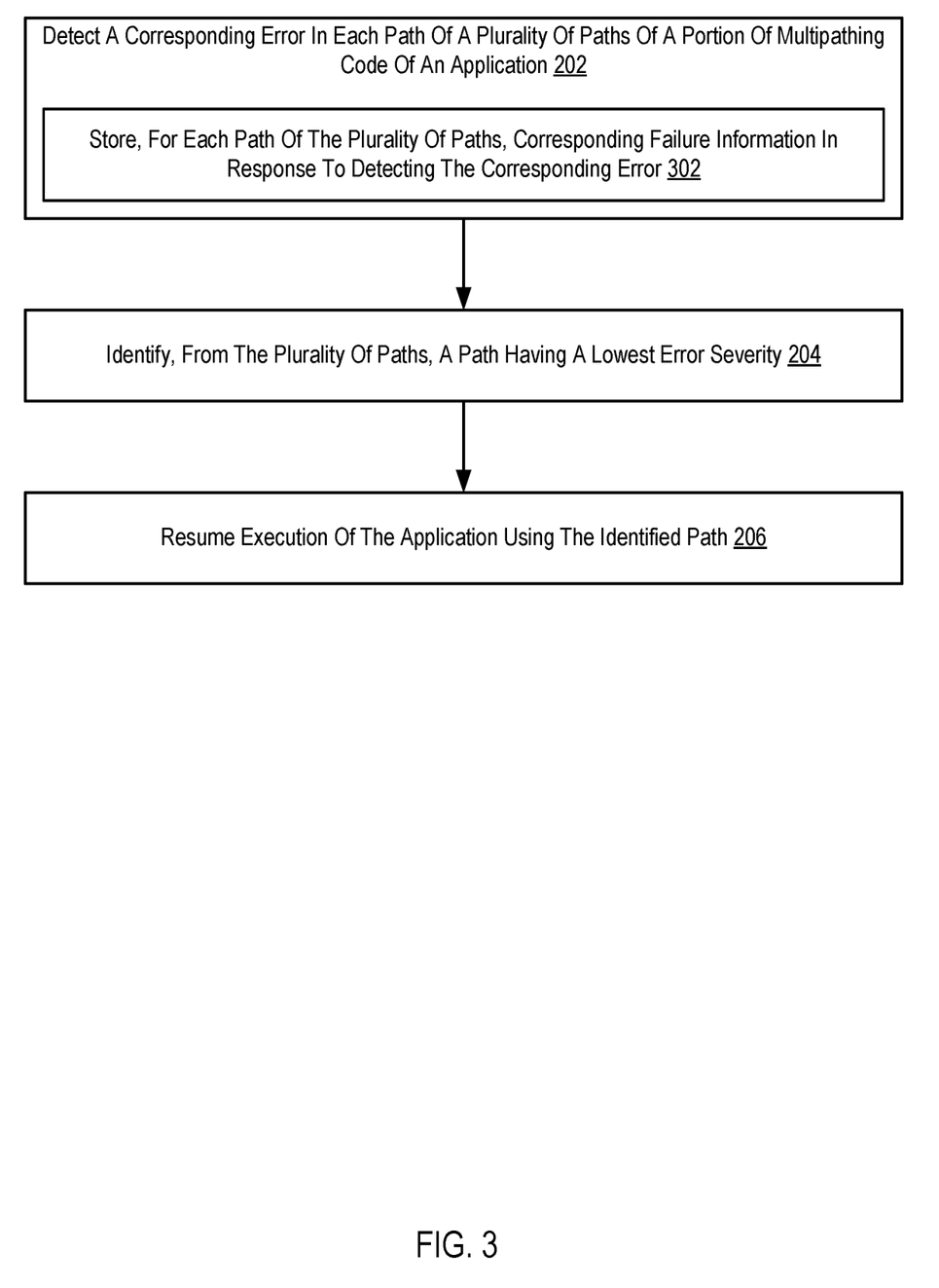
FIG. 3 sets forth a flowchart of another example method for multipathing code execution based on failure severity in accordance with some embodiments of the present disclosure.

For further explanation, FIG. 3 sets forth a flowchart of an example method of multipathing code execution based on failure severity in accordance with some embodiments of the present disclosure. The method of FIG. 3 is similar to FIG.

2 in that the method of FIG. 3 also includes: detecting 202 a corresponding error in each path of a plurality of paths of a portion of multipathing code of an application; identifying 204, from the plurality of paths, a path having a lowest error severity; and resuming 206 execution of the application using the identified path.

The method of FIG. 3 differs from FIG. 2 in that detecting 202 a corresponding error in each path of a plurality of paths of a portion of multipathing code of an application includes storing 302, for each path of the plurality of paths, corresponding failure information in response to detecting the corresponding error. Failure information describes, for a given path of multipathing code, a state of execution captured in response to detecting an error in executing the path of multipathing code. Accordingly, in some embodiments, failure information describes any of the attributes or data points described above that may be used in determining the error severity for the path. For example, failure information may include error codes or descriptions, metrics relating to resource utilization, descriptions of amounts of the path executed prior to the error, and the like.

In some embodiments, the failure information may include similar information as described above with respect to state information capturing a state of execution prior to executing multipathing code. For example, failure information may describe or encode, at the point when an error occurs or is detected, register values, memory values, counter values, and the like. In other words, in some embodiments, the failure information may include one or more data points or attributes such that the failure information may be used to restore a state of execution from the point at which the failure information was generated (e.g., at or after the error was detected in the particular path). Accordingly, in some embodiments, the failure information may be used to restore a state of execution when resuming 206 execution of the application using the identified path.

Refer back to the example above with multipathing code paths A, B, and C. Before executing the multipathing code, state information may be generated describing a state of execution prior to executing the multipathing code. Path A is then executed and an error is detected. Failure information corresponding to path A is then stored, and the previously generated state information is used to restore the execution state to a point prior to executing path A. Path B may then be executed. After detecting the error in path B, failure information corresponding to path B is stored and the state information is again used to restore the execution state such that path C can be executed. After detecting the error in path C, failure information corresponding to path C is stored. The failure information for paths A, B, and C may then be used to identify path B as having the lowest severity level. In some embodiments, the failure information for path B may then be used to restore the execution state to a point at or after detecting the error in path B. Execution of the application may then be resumed from that point.

Figure 4:
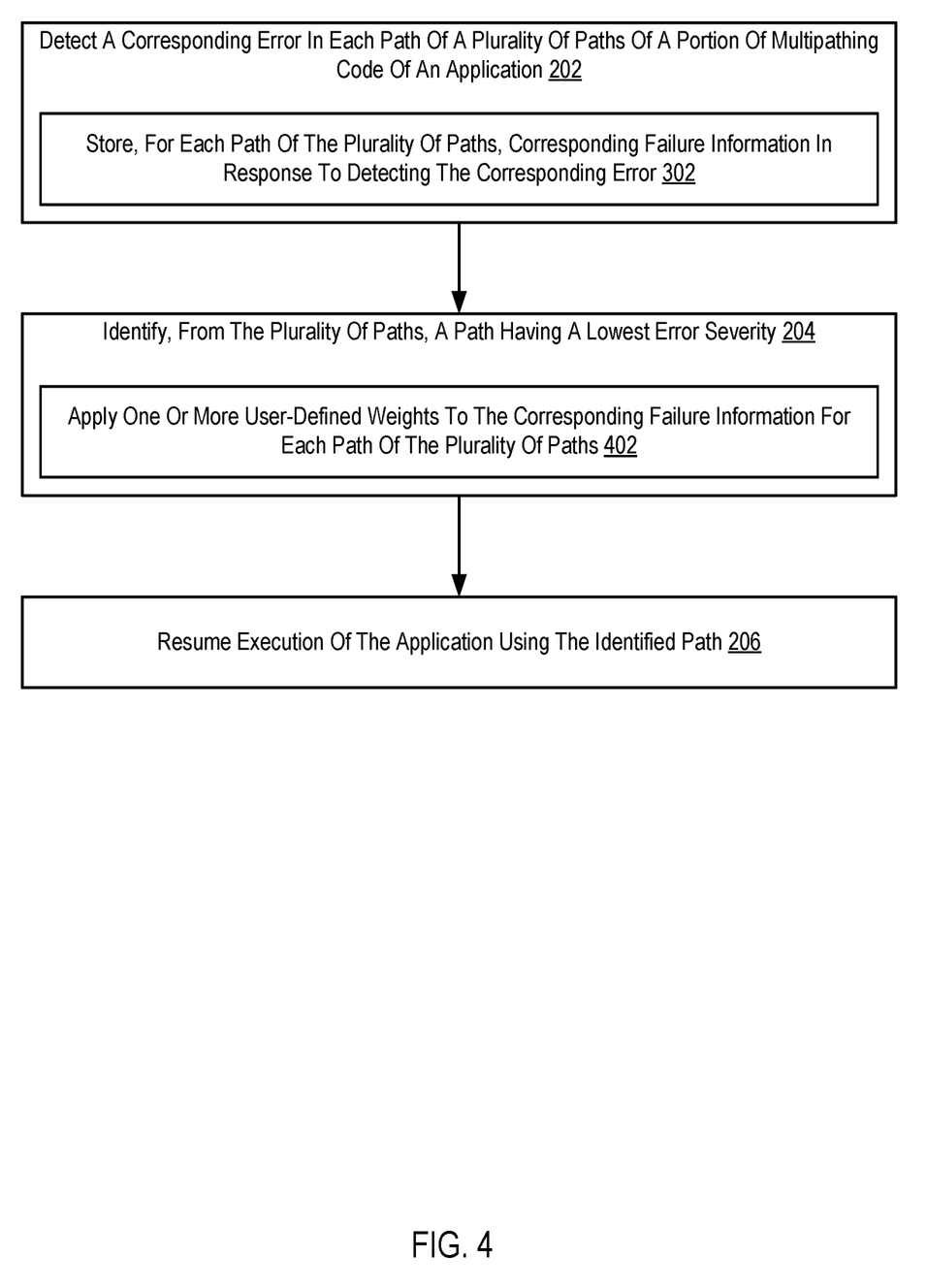
FIG. 4 sets forth a flowchart of another example method for multipathing code execution based on failure severity in accordance with some embodiments of the present disclosure.

For further explanation, FIG. 4 sets forth a flowchart of an example method of multipathing code execution based on failure severity in accordance with some embodiments of the present disclosure. The method of FIG. 4 is similar to FIG. 3 in that the method of FIG. 4 also includes: detecting 202 a corresponding error in each path of a plurality of paths of a portion of multipathing code of an application, including: storing 302, for each path of the plurality of paths, corresponding failure information in response to detecting the corresponding error; identifying 204, from the plurality of paths, a path having a lowest error severity; and resuming 206 execution of the application using the identified path.

The method of FIG. 4 differs from FIG. 3 in that identifying 204, from the plurality of paths, a path having a lowest error severity includes applying 402 one or more user-defined weights to the corresponding failure information for each path of the plurality of paths. The one or more user-defined weights include weights applied to one or more of the data points used in evaluating the error severity for a particular path. Put differently, the one or more user-defined weights affect how a particular weighted data point contributes to the determination of an error severity level for a particular path. The one or more weights are user-defined in that they include configurable values such that the weights may be adjusted based on the particular considerations of the user. Such weights may be used in functions, algorithms, rules, and the like used in determining the error severity for a particular path for which an error was detected.

For example, assume that the amount of a code path executed prior to error is more important to a particular user than resource utilization. In this example, the user may assign a higher weight to the amount of code path executed and a lower weight to resource utilization. Thus, the amount of code path executed will contribute more to a determination of the error severity for a particular code path than resource utilization. As another example, assume that a particular user does not consider health checks, such as data integrity checks, to be important when errors are encountered. In this example, a weight of zero may be assigned to a data integrity health check such that it does not factor in any determination of the error severity of a particular code path.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   detecting a corresponding error in each path of a plurality of paths of a portion of multipathing code of an application;
   identifying, from the plurality of paths, a path having a lowest error severity; and
   resuming execution of the application using the identified path.

2. The method of claim 1, wherein the plurality of paths comprise a plurality of different functionally similar code paths.

3. The method of claim 1:
   wherein detecting a corresponding error in each path of a plurality of paths comprises storing, for each path of the plurality of paths, corresponding failure information in response to detecting the corresponding error; and
   wherein identifying the path having the lowest error severity is based on the corresponding failure information for each path of the plurality of paths.

4. The method of claim 3, wherein identifying the path having the lowest error severity further comprises applying one or more user-defined weights to the corresponding failure information for each path of the plurality of paths.

5. The method of claim 3, wherein identifying the path having the lowest error severity is based on one or more error descriptions in the corresponding failure information for each path of the plurality of paths.

6. The method of claim 3, wherein identifying the path having the lowest error severity is based on an amount of path completion indicated in the corresponding failure information for each path of the plurality of paths.

7. The method of claim 3, wherein identifying the path having the lowest error severity is based on an amount of resource utilization indicated in the corresponding failure information for each path of the plurality of paths.

8. An apparatus comprising:
   a processing device; and
   memory operatively coupled to the processing device, wherein the memory stores computer program instructions that, when executed, cause the processing device to:
   detect a corresponding error in each path of a plurality of paths of a portion of multipathing code of an application;
   identify, from the plurality of paths, a path having a lowest error severity; and
   resume execution of the application using the identified path.

9. The apparatus of claim 8, wherein the plurality of paths comprise a plurality of different functionally similar code paths.

10. The apparatus of claim 8:
    wherein detecting a corresponding error in each path of a plurality of paths comprises storing, for each path of the plurality of paths, corresponding failure information in response to detecting the corresponding error; and
    wherein identifying the path having the lowest error severity is based on the corresponding failure information for each path of the plurality of paths.

11. The apparatus of claim 10, wherein identifying the path having the lowest error severity further comprises applying one or more user-defined weights to the corresponding failure information for each path of the plurality of paths.

12. The apparatus of claim 10, wherein identifying the path having the lowest error severity is based on one or more error descriptions in the corresponding failure information for each path of the plurality of paths.

13. The apparatus of claim 10, wherein identifying the path having the lowest error severity is based on an amount of path completion indicated in the corresponding failure information for each path of the plurality of paths.

14. The apparatus of claim 10, wherein identifying the path having the lowest error severity is based on an amount of resource utilization indicated in the corresponding failure information for each path of the plurality of paths.

15. A computer program product comprising a computer readable storage medium, wherein the computer readable storage medium comprises computer program instructions that, when executed:
    detect a corresponding error in each path of a plurality of paths of a portion of multipathing code of an application;
    identify, from the plurality of paths, a path having a lowest error severity; and
    resume execution of the application using the identified path.

16. The computer program product of claim 15, wherein the plurality of paths comprise a plurality of different functionally similar code paths.

17. The computer program product of claim 15:
    wherein detecting a corresponding error in each path of a plurality of paths comprises storing, for each path of the plurality of paths, corresponding failure information in response to detecting the corresponding error; and
    wherein identifying the path having the lowest error severity is based on the corresponding failure information for each path of the plurality of paths.

18. The computer program product of claim 17, wherein identifying the path having the lowest error severity further comprises applying one or more user-defined weights to the corresponding failure information for each path of the plurality of paths.

19. The computer program product of claim 17, wherein identifying the path having the lowest error severity is based on one or more error descriptions in the corresponding failure information for each path of the plurality of paths.

20. The computer program product of claim 17, wherein identifying the path having the lowest error severity is based on an amount of path completion indicated in the corresponding failure information for each path of the plurality of paths.

\* \* \* \* \*